July 4, 1933.  H. S. HOLMES  1,916,373
WELDING
Filed Aug. 5, 1926  6 Sheets-Sheet 4

Fig. 4.

Inventor
HENRY S. HOLMES.
By his Attorney
D. Anthony Usina

July 4, 1933.  H. S. HOLMES  1,916,373
WELDING
Filed Aug. 5, 1926   6 Sheets-Sheet 5

Inventor
Henry S. Holmes.
By His Attorney

Patented July 4, 1933

1,916,373

UNITED STATES PATENT OFFICE

HENRY S. HOLMES, OF NEW YORK, N. Y., ASSIGNOR, BY MESNE ASSIGNMENTS, TO METROPOLITAN ENGINEERING COMPANY, A CORPORATION OF NEW YORK

WELDING

Application filed August 5, 1926. Serial No. 127,202.

My invention aims to provide certain improvements in the type of welding apparatus and processes in which the parts are pressed together while a welding current is passed through them.

This invention is particularly useful in connection with the Murray method of welding described in Reissue Patent No. 15,466 of October 10, 1922, in which a current of extremely high ampere strength is passed for a very brief regulated period of time.

The accompanying drawings illustrate an embodiment of the invention.

Referring to the embodiment of the invention illustrated, the machine is designed especially for the welding together of two halves of a steel universal joint ball housing. The edges of the parts are pressed together and required current of high amperage is passed, in this particular machine, for a fraction of a second. Various other objects may be welded by substituting dies or electrodes of corresponding shape.

Upon the bed 1 are upright standards 2 united at their upper ends by a cross-girder 3. On the inner side of the uprights are gibs 4 in which slides the movable cross-head 5 which carries a filler piece 6 on the lower face of which is fastened the shoe 7 which carries the upper electrode 7a.

Figure 4:
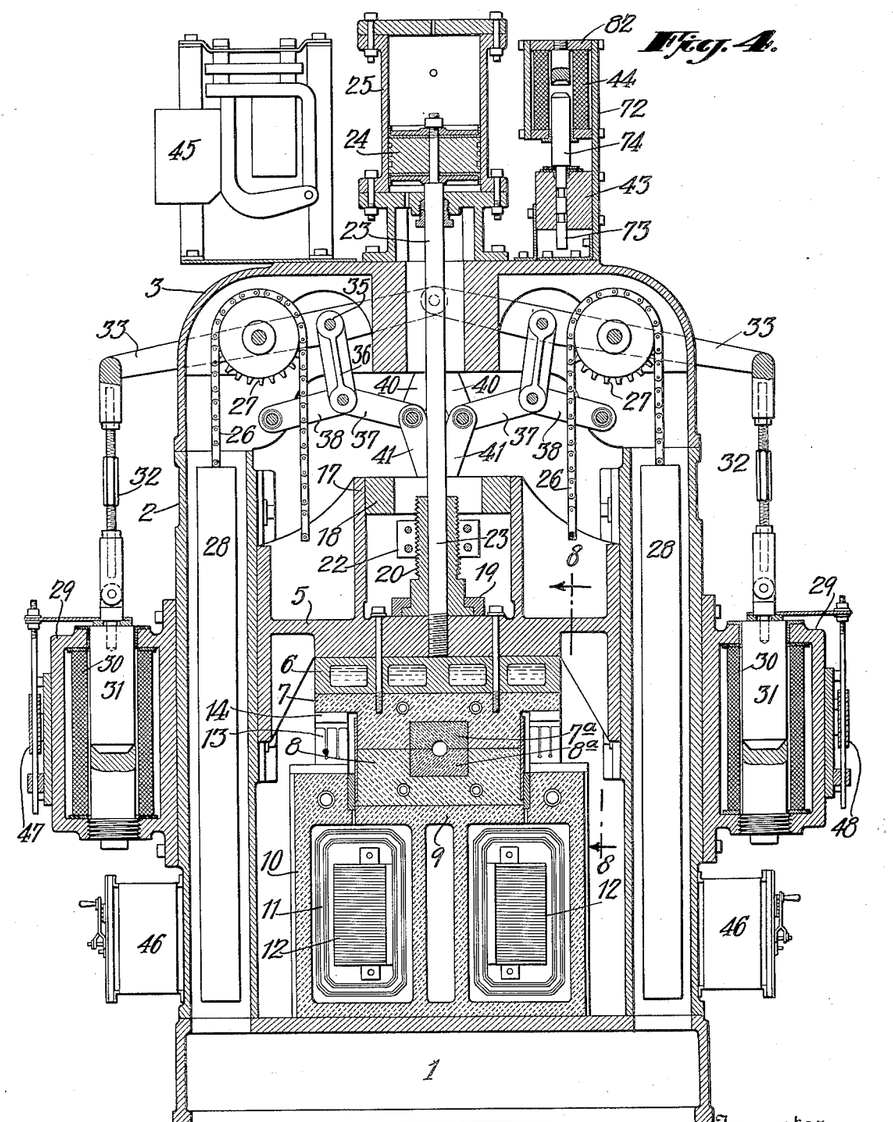
Fig. 4 is a vertical section on the line 4—4 of Fig. 2.

Corresponding to the upper shoe 7 is a lower shoe 8 which carries the lower electrode 8a and which is supported on the centre section 9 of a copper casting, Fig. 4, which forms part of the secondary of the welding transformer. The casting has outside arms 10 extending upward from its base and forming a recess in which are located the primary windings 11 wound about an iron core 12. The electrode shoes 7 and 8 and their immediately adjacent parts are water cooled.

On top of the arms 10 are fastened switch blades 13 in planes parallel with the face of the machine which co-operate with contacts 14 depending from the upper electrode shoe 7 when the latter is in the lower position illustrated. These contacts complete the secondary circuit of the transformer and allow the welding current to flow between the electrodes and through the work. The adjustable stops 15 (Fig. 1) limit the downward movement of the upper electrode. A swinging apron or plate 16 depends in front of the work to prevent sparks from striking the operator.

Figure 6:
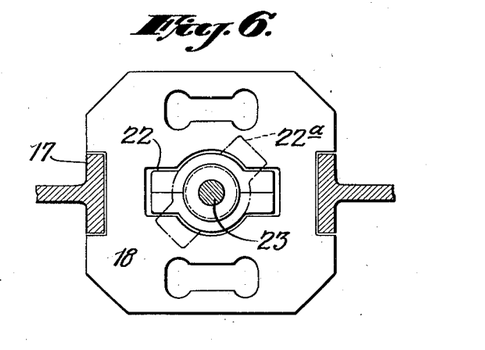
Fig. 6 is a plan of the central part of a sliding crosshead.

The cross-head 5 has upwardly projecting guides 17 between which is a vertically sliding block or plate 18, Fig. 6. Rotatably stepped in ring 19 on the centre of the cross-head 5 is a hollow vertical screw 20. The base of the screw carries a crank 21 projecting to the front of the machine (Fig. 1) by which the screw can be given a quarter turn to the right or left. A split nut 22 is clamped on the screw 20 near its upper end and forms a flanged shape in plan (Fig. 6) adapted to be passed through the similarly shaped opening in the block 18 when the handle is in the right-hand position; but not to pass through said opening when the handle is shifted over to the left as indicated in dotted lines at 22a.

The cross-head is fastened to the lower end of a vertical rod 23 which is connected at its upper end to a piston 24 in an air cylinder 25 supported on the top of the girder 3. The cross-head 5 is also connected by chains 26 running over guide sprockets 27 to counterweights 28 arranged to counterbalance the cross-head and the other moving parts of the machine.

Secured to the outer sides of the upright standards 2 are frames 29 in which are carried powerful solenoids 30 each having a plunger armature 31. These armatures at their upper ends are connected by links 32 to the outer ends of levers 33 which are pivoted at their inner ends by a pivot pin 34. There are two levers 33 at each side. Between each pair there is a pin 35 by which the lever 33 is connected to a link 36 which is pivoted at its lower end to the meeting point of a pair of toggle arms 37 and 38. The pivot point 39 of the outer toggle arm is fixed. The inner arm 37 is pivotally connected to the meeting point of a pair of toggle arms 40 and 41. The toggle arms 41 at their lower ends support the plate 18, see Fig. 1. The upper toggle arms 40 are supported from fixed pins 42 also in the fixed cross-head of the machine.

Figure 1:
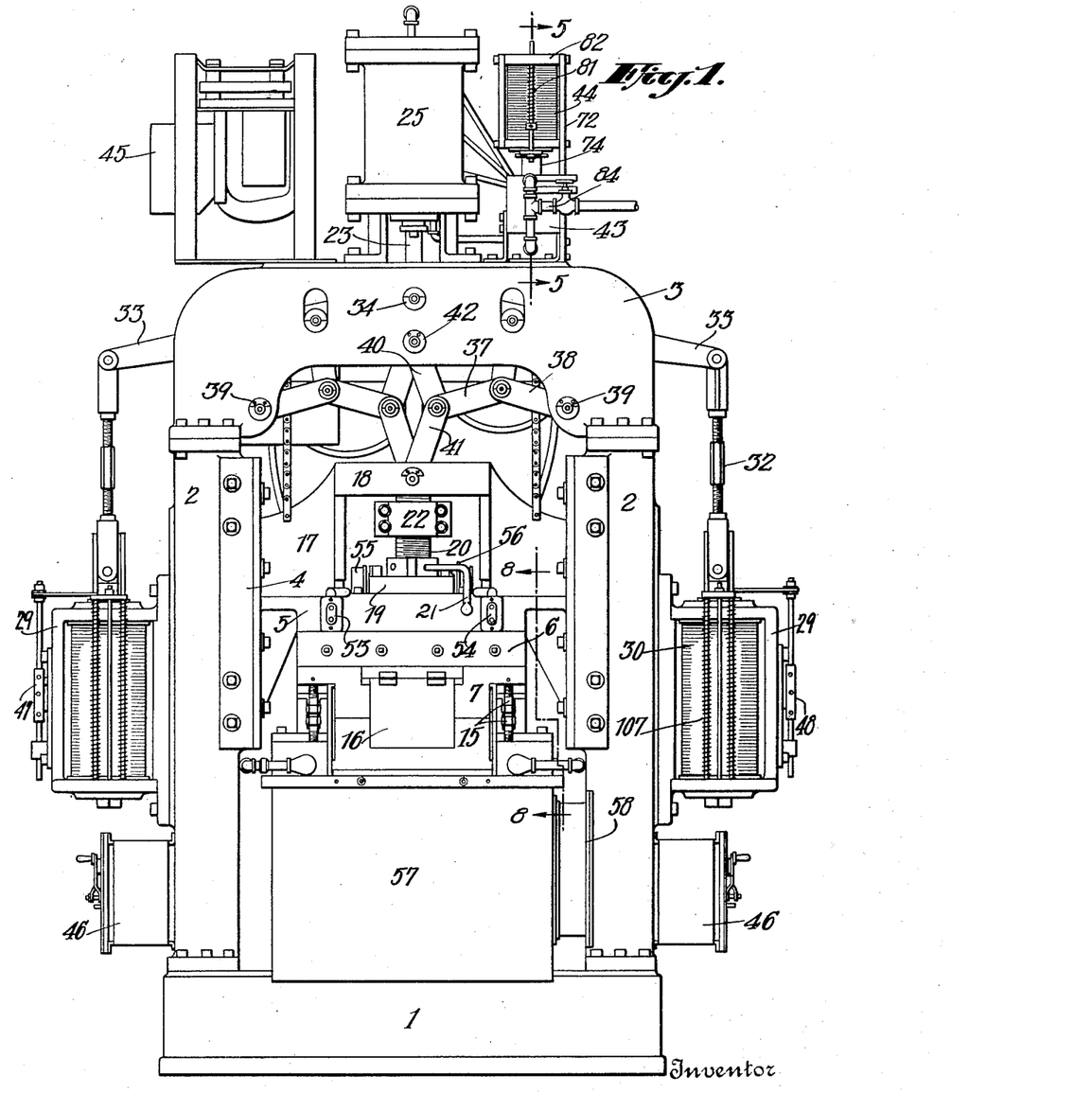
Fig. 1 is a front elevation of the machine, Fig. 2 a side elevation and Fig. 3 a rear elevation.
Figure 2:
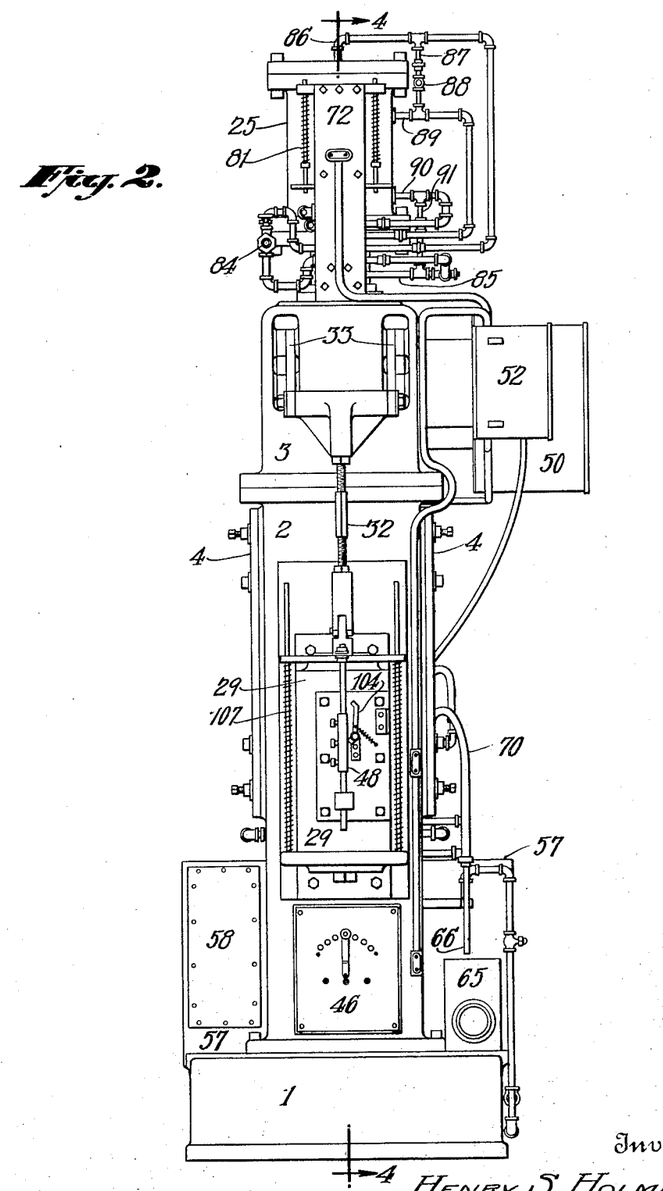

When the armatures of the solenoids 30 are drawn downward the pressure is multiplied through the toggles to force downward the plate 18. If at that time the block 22 on the hollow shaft 20 is in the angular position (that is, if the lever 21 of Fig. 1 is thrown to the left), the downward movement will be transmitted to the cross-head 5 with a very powerful pressure. When the lever 21 is thrown to the right, the solenoids are rendered inoperative for this purpose.

The air cylinder 25 furnishes another means by which the cross-head 5 is pressed down and also the means by which the cross-head is lifted after a welding operation. The air pressure is controlled through a valve indicated as a whole by the numeral 43. This is a plunger valve which in turn is operated by a solenoid 44, the valve and controlling solenoid being mounted on top of the girder 3. Also mounted on this girder is a solenoid operated switch indicated as a whole by the numeral 45. This controls the welding current as explained below in connection with Fig. 9.

Rheostats 46 are mounted on the lower part of the frame, below the solenoids. They are for adjusting the current in the pressure solenoids 30; the rheostats being set once only while the machine is on a given class of work. On the outer sides of the frames 29 of the solenoids are located certain timing contactors 47 at the left and 48 at the right. On the rear (Fig. 3) of the top girder 3 is a double-pole D. C. service switch 49 and certain magnetic contactors 50, 51 and 52 encased in steel boxes. Double push button stations 53, 54, Fig. 1, are fastened on the front of the movable cross-head 5. Each of these consists of two separate switches each with a separate button. On top of the cross-head 5 are the single push button stations 55 and 56 which are actuated by the movement of the handle 21 to the right or to the left. These various electrical controls are of standard or of any suitable design and are therefore not described in detail. Their functions are referred to at length below.

The secondary casting is enclosed in a sheet metal hood 57 shown at the front and back in Figs. 1 and 3 with tubular end pieces 58 and 59 on the respective ends for circulating cooling air through the primary winding. The water cooling arrangements for electrodes are illustrated best in Fig. 3. In the right-hand upright there is located a water pipe 60 having an inlet at its upper end and having branches with valves 61, 62, 63 and 64 leading to the various pipes and jackets. The outlet pipes discharge into a common tank 65 at the left. The discharge is visible from each of the circuits so that the operator can make sure that water is flowing in each circuit and can regulate the rate of flow by feeling the temperature of the discharge water for each circuit.

Three of the discharge pipes are shown respectively at 66, 67 and 68. An insulating joint is shown at 69 to prevent the flow of current, and such a joint may be used wherever it is necessary. The sections of tubing 70 are of rubber so as to allow for the movement of the cross-head and the water cooled block or plate 6.

Figure 5:
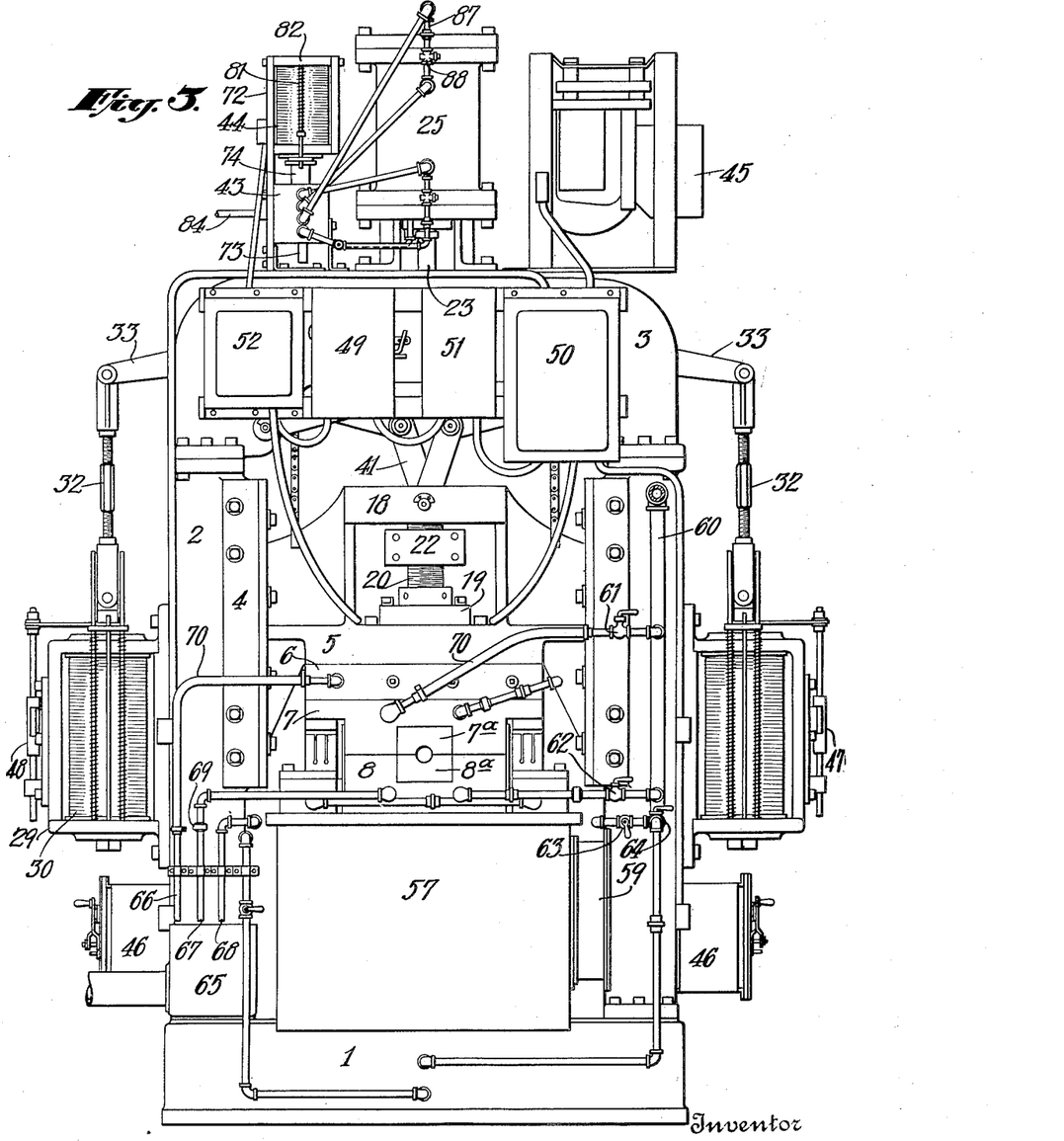
Fig. 5 is a vertical section on the line 5—5 of Fig. 1.
Figures 7, 8:
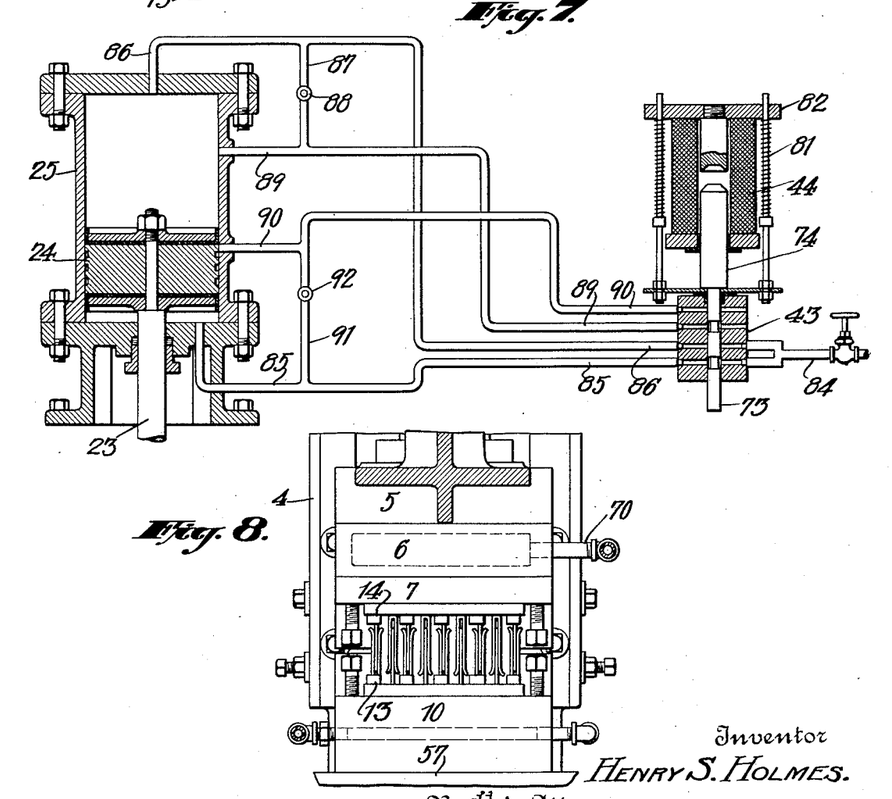
Fig. 7 is a diagram of certain air cylinders and connections.
Fig. 8 is a side elevation partly in section of certain central parts of the machine, the view being taken on the line 8—8 of Figs. 1 and 4.

The valve 43, Figs. 5 and 7, is in a casing or block 71 of cast iron mounted on the side of a bracket 72 (Fig. 4). Sliding in a vertical hole through the block 71 is a brass valve rod 73 which is connected at its upper end to the armature 74 of the solenoid 44 which is mounted on the upper part of the bracket 72. There are four horizontal passages 75, 76, 77 and 78 which permit air to pass through the block 71 according to the position of the ports 79 and 80 of the valve rod, which are of reduced diameter so as to permit the passage of air.

The passageways 75 and 77 are open when the solenoid 44 is energized to lift the valve stem; and the passages 76 and 78 are open when the solenoid is de-energized. This is the position illustrated. The plunger is returned to its downward position by means of springs 81 bearing against the underside of a plate 82 on the top of the coil and forcing down a cross bar 83 which is fastened to the valve stem.

The operation of the air hoist is as follows. See Fig. 7.

Compressed air from a pipe 84 is fed to the two lower passages 77 and 78. When the solenoid 44 is de-energized as illustrated, the lower passage 78 is open and the upper one is closed. Therefore, air passes through the pipe 85 to the port in the bottom of the air cylinder 25 and raises the piston 24. In the meantime air is exhausting to the port in the top of the cylinder and through the pipe 86 and by-pass 87, the valve 88 being open. Air is also exhausting through the port in the side of the cylinder and the pipe 89. The air passes through the open passage 76 in the air valve. After the top of the piston 24 passes the port leading to the pipe 89, air can escape through the pipe 86 and by-pass 87 only.

By adjusting the opening in the cock 88 in the by-pass, an air cushion is provided which will prevent banging impact of the piston against the head of the cylinder at the end of a stroke, without retarding the movement of the piston during the greater part of the stroke.

When the solenoid 44 is energized to lift the valve stem 73, the action is reversed. Air is then admitted through the pipe 86 to the top of the cylinder, forcing down the piston, which will travel freely until it closes the side port leading to the pipe 90. Thereafter the air will pass out through the bottom pipe 85 and the by-pass 91 in which is a valve 92 which can be set to retard the movement of the piston as desired.

Figure 9:
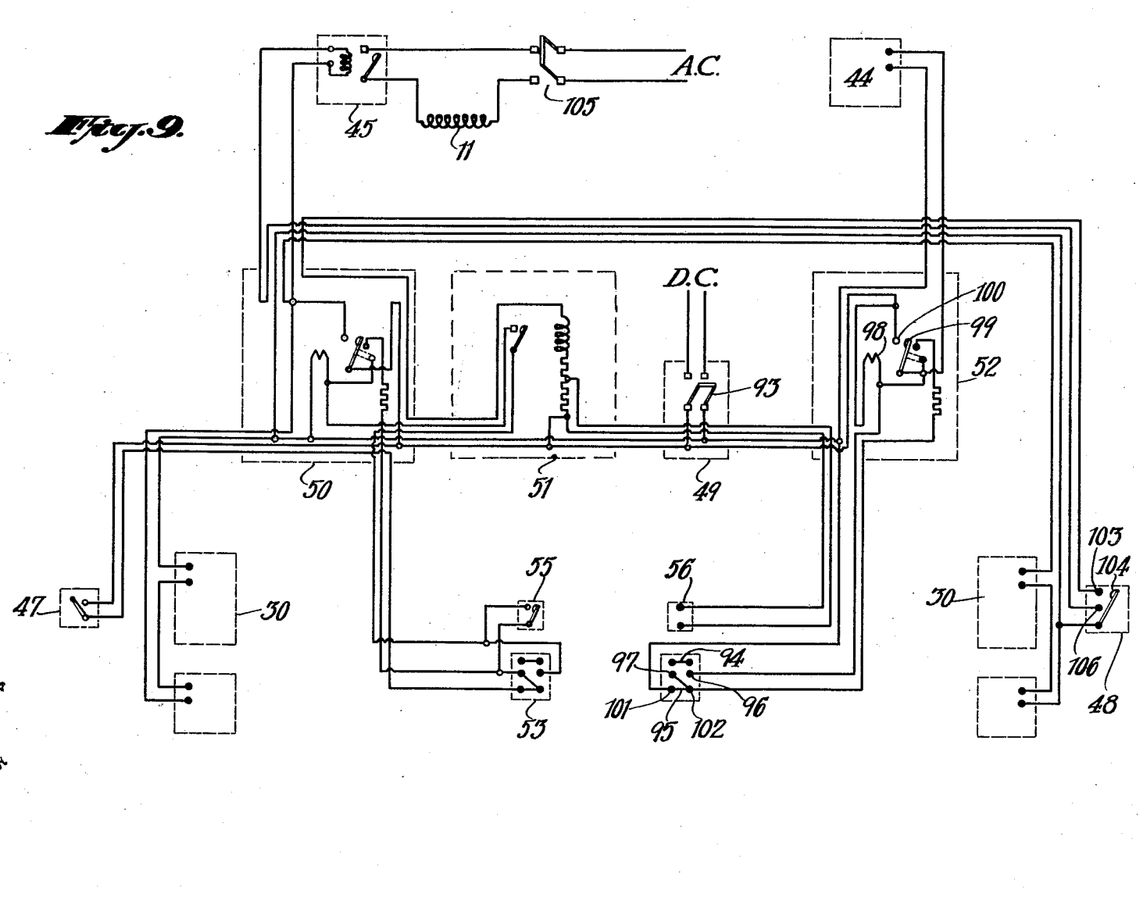
Fig. 9 is a wiring diagram showing the electrical connections.

The air valve solenoid 44 and the pressure solenoids 30 are direct current apparatus. The welding current is alternating. The direct current comes in at the switch 93 at the station previously referred to in general by the numeral 49. The contactors of the stations 50, 51 and 52 are of the standard holding coil type arranged for three-wire control. At the push button station 54 there are two buttons 94 and 95. Pressure on the button 94 bridges the contacts 96 and 97, which energizes a coil 98 in the contactor 52, which swings the contacting end 99 of a switch into engagement with a fixed contact 100, and this closes the circuit through the air valve solenoid 44 which causes a downward air pressure on the movable electrode of the machine.

Pressure on the button 95 separates the contacts 101 and 102 which were formerly bridged by the push button. This de-energizes the coil 98 in the contactor 52, allowing the switch 99 to open and thus de-energizing the solenoid 44 whereupon the air valve will be shifted and the air pressure will be used to hoist the movable electrode.

The push button 56 controls the contactor 51. Closing this push button causes the contactor to close. The contactor 51 is in series with the closing coil of the contactor 50. The switch in the contactor 51 is opened by the timing device 48 at the right-hand side of the machine. The separation of the contacts 103 and 104 of this timing device opens the contactor 51.

The left-hand push button 55 serves to close the contactor 50 (provided the circuit through the contactor 51 is closed). The closing of the contactor 50 results in the closure of the switch 45, which allows alternating current to flow through the primary coil 11 of the transformer and to start the weld, when the main switch 105 of the alternating current circuit is closed.

The closing of the contactor 50 also energizes the pressure solenoids 30 at the opposite sides of the machine, to exert a powerful downward pressure through the toggle mechanism on the block 18. When the arm of the timing device 48 is thrown out breaking the circuit through the contact 106, the switch 45 which controls the welding current is opened and such current discontinued. The opening of the switch 47 at the left breaks the circuit at the contactor 50 and through the pressure magnets so as to release the pressure of the solenoids on the work.

The push button station 53 is not used under ordinary operating conditions. But it can be used for experimental work instead of the switches 47 and 55.

The operation of the separate parts having been explained, it remains only to describe the operation of the machine as a whole.

Assuming that the movable electrode is in its upper position; one of the parts to be welded is placed in the appropriately shaped recess in the lower electrode 8ª. The other piece to be welded is placed on top of the first, with its edges in register. The switches 93 and 105 have been closed and the valve in the air pipe 84 opened.

The first operation is to push the button 94, which is marked "lower". This energizes the air valve solenoid 44, which raises the air valve and allows the compressed air to enter the top of the air cylinder 25. This forces the upper electrode down until it clamps the two parts to be welded. Now, when the upper electrode has been thus lowered the top of the shoulder or nut 22 will be slightly below the bottom of the block 18, as indicated in Figs. 1 and 4. The handle 21 has been resting against the push button 56, with the consequent closing of the contactor 51. The handle is now moved to the left until it strikes the push button 55 and closes this switch. This starts the welding current and energizes the pressure magnets as described above.

The armatures of the solenoids have to travel an inch or so before the movement communicated through toggles to the block 18 will be sufficient to bring this down to the shoulder 22. During this initial movement of the magnetic pressure devices, and connected parts, the work-pieces are receiving the welding current but are pressed together only by the air pressure.

The handle having been moved to the left to swing the shoulder 22 to the oblique position, the further downward movement of the solenoid armatures is transmitted through the block 18, shoulder 22, screw 20 to the movable cross-head and electrode so as to exert on the work a pressure very much greater than that which was used in the initial stages and was effected through the air cylinder 25. The shoulder may be adjusted by screwing it up and down on the screw 20 so as to vary the point or time at which the magnetic pressure is actuated to supplement the air pressure.

As the plunger armatures 31 are drawn downward the electrodes take up the allowed quantity of metal at the edges of the joint. At a predetermined point in their movement, the solenoid plunger at the right opens the contacts of the timing device 48. This results in the stopping of the welding current and the opening of the circuit through the contactor 51. At a predetermined point further along in the downward stroke of the plunger armatures, the switch 47 at the left is opened. This breaks the circuit of the magnet pressure apparatus and permits the plungers to be returned to the top of their stroke by the usual springs 107.

The welding being completed and the block 18 being lifted by the solenoids to the position in Figs. 1 and 4, the handle 21 is swung around to the right. This brings the shoulder or collar 22 in register with the opening in the block 18 to permit its passage through this block. The push button 95 at the right (which will usually be marked "raise") is now pushed by the operator. This deenergizes the air valve solenoid 44, shifting the air valve so as to admit air to the bottom of the cylinder and to hoist the upper electrode so as to permit removal of the work.

In the particular machine illustrated the magnetic pressure (by which I mean the pressure exerted through the solenoids 30) on the work, is about five times that of the air pressure exerted on the work, the figures being about 30,000 and 6,500 pounds respectively. These ratios and also the exact amounts will be varied according to circumstances in the machine illustrated. The movable electrode and connected parts are nicely counterbalanced, but the counterweights may be omitted, using the air pressure only for hoisting the moving head and allowing it to fall by gravity.

For the initial, moderate, pressure we would depend therefore only on the weight of the parts, using the high magnetic pressure at the end as before described.

Various other means may be provided for securing a moderate initial clamping pressure, to be supplemented by a heavy pressure at the end of the operation. Solenoids are practically adapted to this sort of use because they have a short stroke and at the same time a powerful pull. The supplemental or final pressure may however be secured through various types of electric motors or other pressure mechanisms.

The combination pressure mechanism enables us to quicken the operation of the machine. If the solenoids alone were used and it were attempted to energize them and to start the welding current simultaneously, burning and pitting would occur between the surfaces of the pieces being welded and the surfaces of the electrodes, because there is an instant of delay in transmitting pressure to the weld after the solenoids have been energized. Therefore, if solenoids alone are used it is necessary to energize them before starting the welding current. This necessitates two movements on the part of the operator and delays the action of the machine.

A fluid motor alone cannot be used in the case of rapid high power welding because it will not respond quickly enough to effect the take-up within the brief time interval required for this kind of welding, generally a fraction of a second. Also for many cases the size of the cylinder necessary to produce the required pressure would prohibit the employment of such an apparatus.

The light pressure at the beginning of the operation causes some arcing and quick heating of the parts; the heavy pressure being desirable only after the parts are heated.

The present invention is an improvement in several respects on the machine of the Murray & Woodrow patent, No. 1,187,543. I have improved the Murray & Woodrow machine in various ways, for example, by the use of an air cylinder for raising and lowering the movable electrode, by starting the welding current slightly before the pressure magnets begin to effectively function, by the physical separation of the movable cross-head from the toggle mechanism, and the manually operated means for making the toggle mechanism operative on the cross-head and for permitting the lifting of the cross-head without interference from the toggles.

Various modifications of the described apparatus and method may be made by those skilled in the art without departing from the invention as defined in the following claims.

What I claim is:

1. An electric welding machine including electrodes, pneumatic means for clamping the workpieces together between said electrodes with a comparatively light and substantially constant pressure, and solenoid mechanism adapted to exert a powerful pressure to take up the work.

2. An electric welding machine including electrodes, air pressure mechanism for clamping the workpieces together between the electrodes, means for passing a welding current between the workpieces while thus clamped together under air pressure and solenoid mechanism for exerting a powerful pressure to take up the work.

3. An electric welding machine including in combination a power generating and multiplying mechanism for exerting a powerful pressure on the work, a movable cross-head and manually controlled means for transmitting such pressure to the cross-head and for rendering said mechanism inoperative to move the cross-head.

4. An electric welding machine including a movable cross-head, a plate and power multiplying device for advancing said plate and a device carried by the cross-head adapted in one position to be engaged by said plate to cause the advancement of the cross-head and in another position to permit retractile movement of the cross-head without engaging said device by the plate.

5. An electric welding machine including in combination electrodes, relatively low pressure means for clamping work pieces together between said electrodes, means independent of the clamping means for applying a welding current through said work-pieces upon the operation of said low pressure clamping means and means for later applying a more powerful take-up pressure.

6. An electric welding machine including in combination electrodes, relatively low pressure means for clamping the work pieces together between said electrodes, a relatively high pressure take-up means and a manually operated means to establish a welding current through said work-pieces upon the operation of said clamping means and initiate said take-up means.

7. An electric welding machine including in combination electrodes, a cross head carrying one of said electrodes, pneumatic mechanism for exerting a comparatively light and substantially constant pressure on said cross head to clamp the work pieces together, a power multiplying device which is inoperative during such clamping movement and means for rendering said device operative and applying the welding current and operating said device after the clamping operation.

In witness whereof, I have hereunto signed my name.

HENRY S. HOLMES.